(12) United States Patent
Wang (10) Patent No.: US 11,662,071 B1
(45) Date of Patent: May 30, 2023

(54) 3D-PATTERN WAVING PROJECTING LAMP

(71) Applicant: Zhengyu Wang, Zhuhai (CN)

(72) Inventor: Zhengyu Wang, Zhuhai (CN)

( * ) Notice: Subject to any disclaimer, the term of this patent is extended or adjusted under 35 U.S.C. 154(b) by 0 days.

(21) Appl. No.: 17/980,039

(22) Filed: Nov. 3, 2022

(51) Int. Cl.
| | |
|---|---|
| *F21S 10/00* | (2006.01) |
| *F21V 5/00* | (2018.01) |
| *F21V 14/08* | (2006.01) |
| *F21V 11/16* | (2006.01) |
| *F21Y 115/10* | (2016.01) |

(52) U.S. Cl.
CPC ............ *F21S 10/007* (2013.01); *F21V 5/008* (2013.01); *F21V 11/16* (2013.01); *F21V 14/08* (2013.01); *F21Y 2115/10* (2016.08)

(58) Field of Classification Search
CPC .......... F21V 5/008; F21V 11/16; F21V 14/08; F21S 10/007
See application file for complete search history.

(56) References Cited

U.S. PATENT DOCUMENTS

| | | | | |
|---|---|---|---|---|
| 6,833,539 B1 * | 12/2004 | Maeda | ............... | A44C 15/0015 63/29.1 |
| 7,033,037 B2 * | 4/2006 | Chen | ......................... | F21V 5/00 362/104 |
| 9,013,775 B2 * | 4/2015 | Dear | ...................... | G02B 27/08 359/209.1 |
| 9,068,726 B2 * | 6/2015 | Zhang | ....................... | F21S 8/00 |
| 9,267,660 B1 * | 2/2016 | Wang | ...................... | F21S 8/035 |
| 9,310,059 B2 * | 4/2016 | Zhang | ..................... | F21S 10/06 |
| 9,504,101 B2 * | 11/2016 | Zhang | ..................... | F21V 5/045 |
| 9,551,472 B2 * | 1/2017 | Ding | ....................... | F21S 6/001 |
| 9,632,214 B2 * | 4/2017 | Streppel | ............... | G02B 3/0006 |
| 9,664,373 B2 * | 5/2017 | Zhang | ..................... | F21V 14/06 |
| 9,857,061 B1 * | 1/2018 | Deng | ..................... | F21V 15/01 |
| 9,890,938 B2 * | 2/2018 | Zhang | ..................... | F21V 14/00 |
| 10,228,112 B2 * | 3/2019 | Chien | ................. | F21V 23/0442 |
| 10,234,118 B2 * | 3/2019 | Zhang | ..................... | F21V 14/06 |
| 10,400,966 B2 * | 9/2019 | Chang | .................... | A63H 27/10 |
| 11,041,596 B1 | 6/2021 | Zhang | | |
| 11,079,080 B2 * | 8/2021 | Chien | ................... | F21S 10/002 |
| 11,168,869 B2 * | 11/2021 | Pet | ......................... | G02B 5/045 |

(Continued)

FOREIGN PATENT DOCUMENTS

| | | |
|---|---|---|
| CN | 112728465 B | 10/2021 |
| CN | 216248734 U | 4/2022 |

*Primary Examiner* — Arman B Fallahkhair (57) ABSTRACT

The present application belongs to the technical field of a lamp, and, relates to a 3D-pattern waving projecting lamp. The 3D-pattern waving projecting lamp includes a lamp shell assembly, a control circuit board, a first rotating assembly, and a 3D-pattern projecting assembly. A 3D-pattern imaging assembly includes a first light source, a first convex lens, a second convex lens, a third convex lens, and a first pattern sheet. The first pattern sheet forms a light spot and forms a light pattern. The second convex lens is arranged on the first rotating assembly and located on a side of the first pattern sheet towards the first convex lens. The second convex lens receives the light pattern and generates an analog 3D pattern. The first rotating assembly drives the second convex lens to rotate, which can achieve movement and focusing of the plurality of 3D patterns, project the patterns with a plurality of 3D effects, and enable a user to quickly immerse among the patterns, thereby improving the user's experience.

10 Claims, 9 Drawing Sheets

(56) References Cited

U.S. PATENT DOCUMENTS

| | | |
|---|---|---|
| 11,215,911 B2 | 1/2022 | Obinata et al. |
| 11,428,386 B2 * | 8/2022 | More ...................... F21V 14/08 |
| 2007/0097681 A1 * | 5/2007 | Chich ..................... F21V 14/02 |
| | | 362/555 |
| 2017/0082254 A1 * | 3/2017 | Zhang .................... F21V 29/73 |
| 2021/0381666 A1 | 12/2021 | Zheng et al. |
| 2023/0061205 A1 * | 3/2023 | Yang ...................... F21V 23/04 |

* cited by examiner

3D-PATTERN WAVING PROJECTING LAMP

TECHNICAL FIELD

The present application relates to the technical field of a lamp, and more specifically and particularly to a 3D-pattern waving projecting lamp.

TECHNICAL BACKGROUND

With development of society, people's demands on living standards are increasing.

People have more demands on a lighting atmosphere. A light fixture that can only emit monotonous light is far from meeting people's needs. People are beginning to pay attention to a projecting lamp that can create a wonderful lighting atmosphere. U.S. Pat. No. 8,057,045B2 provides a star field projecting device, which generates two mutually superimposed nebula patterns by using two sets of projecting structures, respectively. U.S. Pat. No. 11,041,596B1 provides a musical starry sky lamp, which projects a light source on an irregular convex lens, projects different shapes of aurora patterns to solve the problem of the monotonic light effect of the light fixture in the prior art, and provides a dynamic projection effect, but it is still difficult to allow the user to immerse in his experience, and it is easy to bring about aesthetic fatigue.

SUMMARY

An objective of the utility model is to provide a 3D-pattern waving projecting lamp, which can realize movement and focusing of a plurality of 3D-patterns, and project a plurality of 3D effect patterns, so that a user can quickly immerse in the patterns, thereby improving the user's experience.

To solve the problems raised above, an embodiment of the utility model provides a technical solution as follows:

a 3D-pattern waving projecting lamp includes a lamp shell assembly, a control circuit board, a first rotating assembly, and a 3D-pattern projecting assembly.

The 3D-pattern projecting assembly includes a first light source, a first convex lens, a second convex lens, a third convex lens, and a first pattern sheet. The lamp shell assembly is provided with a first light outlet. The first convex lens is arranged in the first light outlet. The control circuit board, the first rotating assembly, the first light source, the second convex lens, the third convex lens, and the first pattern sheet are arranged in the lamp shell assembly. The first light source and the first rotating assembly are arranged on the control circuit board. The first light source and the first rotating assembly are electrically connected to the control circuit board. The third convex lens is arranged on a side of the first light source towards the first convex lens. The third convex lens focuses light emitted by the first light source to form a light spot. The first pattern sheet is arranged on a side of the third convex lens towards the first convex lens. The first pattern sheet receives the light spot and forms a light pattern. The second convex lens is arranged on the first, rotating assembly and located on a side of the first pattern sheet towards the first convex lens. The second convex lens receives the light pattern and generates an analog 3D graphic. The first rotating assembly drives the second convex lens to rotate, and the first convex lens receives the analog 3D graphic and generates a plurality of graphics.

The first convex lens includes a plurality of convex lenses having shapes such as triangles or hexagons, or the first convex lens includes a plurality of irregular circular-arc condensing lenses arranged in a middle of the first convex lens and a plurality of mixed condensing lenses having shapes such as the triangles or the hexagons and arranged on both sides of the first convex lens, or the first convex lens includes nine or fewer irregular long-bar condensing lenses arranged in the middle of the first convex lens and the plurality of mixed condensing lenses having shapes such as the triangles or the hexagons and arranged on the both sides of the first convex lens.

The first rotating assembly includes a first motor, a first reduction gearbox, a first transmission shaft, a first gear, a first convex lens seat, a first bracket, and a first bracket cover. The first bracket and the first motor are arranged on the control circuit board. The first motor is electrically connected to the control circuit board. The first reduction gearbox is connected to the first motor. The first transmission shaft is connected to the first reduction gearbox, and the first gear is arranged on the first transmission shaft.

The first bracket cover is arranged on the first bracket. The first convex lens seat is arranged between the first bracket and the first bracket cover and capable of being rotated between the first bracket and the first bracket cover. A second gear is arranged on the first convex lens seat. The second gear is meshed with the first gear. The second convex lens is fixedly arranged on the first convex lens seat. The second convex lens is a convex lens with a decorative design. One convex surface of the second convex lens is an arc surface, and the other surface of the second convex lens has the uneven decorative design.

Further, the 3D-pattern waving projecting lamp further includes a graphic light effect assembly. Me graphic light effect assembly includes a light beam generator, a second light, source, a condensed light cup, a second pattern sheet, a fourth convex lens, a second bracket, and a first sleeve. The second light source is arranged on the light beam generator. The first sleeve is covered and arranged on the light beam generator. The second light source, the condensed light cup, the second pattern sheet, and the second convex lens are provided in the first sleeve sequentially. The lamp shell assembly is provided with a second light outlet. The second bracket is provided at the second light outlet, and the first sleeve is provided on the second bracket.

Further, the 3D-pattern waving projecting lamp further includes a laser starry sky assembly. The laser starry sky assembly includes a laser module and a laser optical grating. A second sleeve is arranged on the first sleeve. The laser optical grating and the laser module are arranged within the second sleeve, and the laser optical grating is located on a side of the laser module towards the second light outlet.

Further, the lamp shell assembly includes a first housing and a second housing. The first housing and the second housing are formed with a receiving space, and the control circuit board, the first rotating assembly, the first light source, the second convex lens, the third convex lens, and the first pattern sheet are arranged in the receiving space.

Further, the 3D-pattern waving projecting lamp further includes a lens bracket. The lens bracket is arranged on the control circuit board. The third convex lens is arranged within the lens bracket. The first pattern sheet is arranged on the lens bracket; and the first pattern sheet consists of a transparent, opaque, translucent, black and white, or colored sheet-shaped article.

Further, the first pattern sheet is a film or a shading sheet.

Further, the 3D-pattern waving projecting lamp further includes a light-emitting, assembly, a second rotating assembly, a fifth convex lens, a sixth convex lens, and a film assembly, the film assembly is detachably arranged on a housing assembly, the light-emitting assembly, the second, rotating assembly, and the sixth, convex lens are arranged on the control circuit board, the light-emitting assembly and the second rotating assembly are electrically connected to the control circuit board, and the fifth convex lens is arranged on the second rotating assembly.

Further, the lamp shell assembly includes a third housing, a fourth housing, and a cover body. The third housing and the fourth housing are formed with a receiving space. The light-emitting assembly, the second rotating assembly, the fifth convex lens, the sixth convex lens, and the film assembly are arranged in the receiving space, and the third housing is provided with two cylindrical openings and one long bar-shaped opening.

The film assembly includes a film bracket base, a third film, and a film bracket cover. The third film is arranged on the film bracket base. The film bracket cover is arranged on the third film. The film assembly is inserted into or pulled out of the lamp shell assembly via the long bar-shaped opening. The 3D-pattern waving projecting lamp further includes a transparent sheet, and, the transparent sheet is arranged on the cylindrical opening.

Further, the fifth convex lens includes six or more convex lenses, and the fifth convex lens is connected to the second rotating assembly.

The sixth convex lens includes four or more planoconvex lenses. The four or more planoconvex lenses form a joined planoconvex lens. Two or more mounting feet are provided on the sixth convex lens, and the mounting feet are arranged, on the light-emitting assembly.

The light-emitting assembly includes four or more LED beads. Each of the LED beads corresponds to a central position of each of the planoconvex lenses in the sixth convex lens, and the third film is located between the fifth convex lens and the sixth convex lens.

Further, the second rotating assembly includes a second motor, a second reduction gearbox, and a second transmission shaft. The second reduction gearbox is connected to the second motor. The second transmission shaft is connected to the second reduction gearbox, and the fifth convex lens is arranged on the second transmission shaft.

Compared with the prior art, the embodiment of the utility model has the following beneficial effects:

For a 3D-pattern waving projecting lamp, a first convex lens is arranged on a first light outlet of a lamp shell assembly. A first light source is arranged on a control circuit board. A third convex lens is arranged on a side of the first light source towards the first convex lens. A first pattern sheet is arranged on a side of the third convex lens towards the first convex lens, and a second convex lens is arranged on a first rotating assembly and located on a side of the first pattern sheet towards the first convex lens. Light generated by the first light source passes through the third convex lens. The third convex lens focuses the light and forms a suitable size of a light spot. The light spot illuminates on a graphic of the first pattern sheet and forms a light pattern. The light pattern is then projected on the second convex lens. Many decorative designs in irregular shapes and irregular sizes and with varying heights of raised portions are provided on a plane of the second convex lens. The light pattern is focused by the second convex lens to form one analog 3D graphic. The analog 3D graphic then passes through the first convex lens. Since many condensing lenses are provided on the first convex lens, each of the condensing lens focuses this 3D pattern to form many graphics, so that an entire light effect area becomes a plurality of large and bright 3D effects, which can make the pattern wave. The first motor drives a first transmission shaft to rotate via a first reduction gearbox, and drives a first convex lens seat to rotate via cooperation of the first gear and the second gear, thereby driving the second convex lens to rotate, realizing movement of the 3D pattern, producing a visually dynamic effect in a projecting process, and improving a user' experience.

BRIEF DESCRIPTION OF THE DRAWINGS

To explain a solution of the utility model more clearly, the following briefly introduces the drawings that need to be used in the embodiments. Obviously, the drawings in the following description are some of embodiments of the utility model. The person skilled in the art can obtain other drawings based on these drawings without creative work.

The description of reference signs

1. Control circuit board; 2. Lamp shell assembly; 21. First housing; 22. Second housing; 23 First light outlet; 24. Second light outlet; 25. Third housing; 251. Cylindrical opening; 252. Long bar-shaped opening; 26. Fourth housing; 27. Cover body; 3. First rotating assembly; 31. First motor, 32. First reduction gearbox; 33. First transmission shaft; 34. First gear; 35. First convex lens seat; 36. First bracket; 37. First bracket cover; 38. Lens bracket; 4. 3D-pattern projecting assembly; 41. First light source; 42. First convex lens; 43. Second convex lens; 44. Third convey: lens; 45. First pattern sheet; 5. Graphic light effect assembly; 51. Light beam generator; 52. Second light source; 53. Condensed light cup; 54. Second pattern sheet; 55. Fourth convex lens; 56. Second bracket; 57. First sleeve; 58. Second sleeve; 6. Laser starry sky assembly; 61. Laser module; 62. Laser optical grating; 7. Light-emitting assembly; 8. Second rotating assembly; 81. Second motor; 82. Second reduction gearbox; 83. Second transmission shaft; 9. Film assembly;

91. Film bracket base; 92. Third film; 93. Film bracket cover; 10. Fifth convex lens; 11. Sixth convex lens; 12. Transparent sheet.

DETAILED DESCRIPTION OF EMBODIMENTS

Unless otherwise specified, all technical and scientific terms used herein have the same meaning as commonly understood by the person skilled in the art to which the utility model belongs. The terms used in the description of the utility model only are for an objective of describing specific embodiments, and are not intended to limit the utility model. The terms "comprising" and "having" and any variant thereof in the specification and claims of the utility model and the description of the drawings above are intended to cover inclusions that are not exclusive. The terms "first," "second," and the like in the specification and claims of the utility model or in the above drawings are used to distinguish between different objects, rather than to describe a specific order.

"Embodiments" referred to herein means that a specific feature, structure, or characteristic described in connection with the embodiments may be included in at least one embodiment of the utility model. The occurrence of this phrase in various positions in the specification does not necessarily refer to the same embodiment, nor is it an independent or alternative embodiment that is mutually exclusive from other embodiments. It is expressly and implicitly understood by the person skilled in the art that the embodiments described herein may be combined with other embodiments.

To make the person skilled in the art better understand the solution of the utility model, the technical solution in the embodiments of the utility model will be described clearly and completely with reference to the relevant drawings.

Embodiment 1

Figure 1:
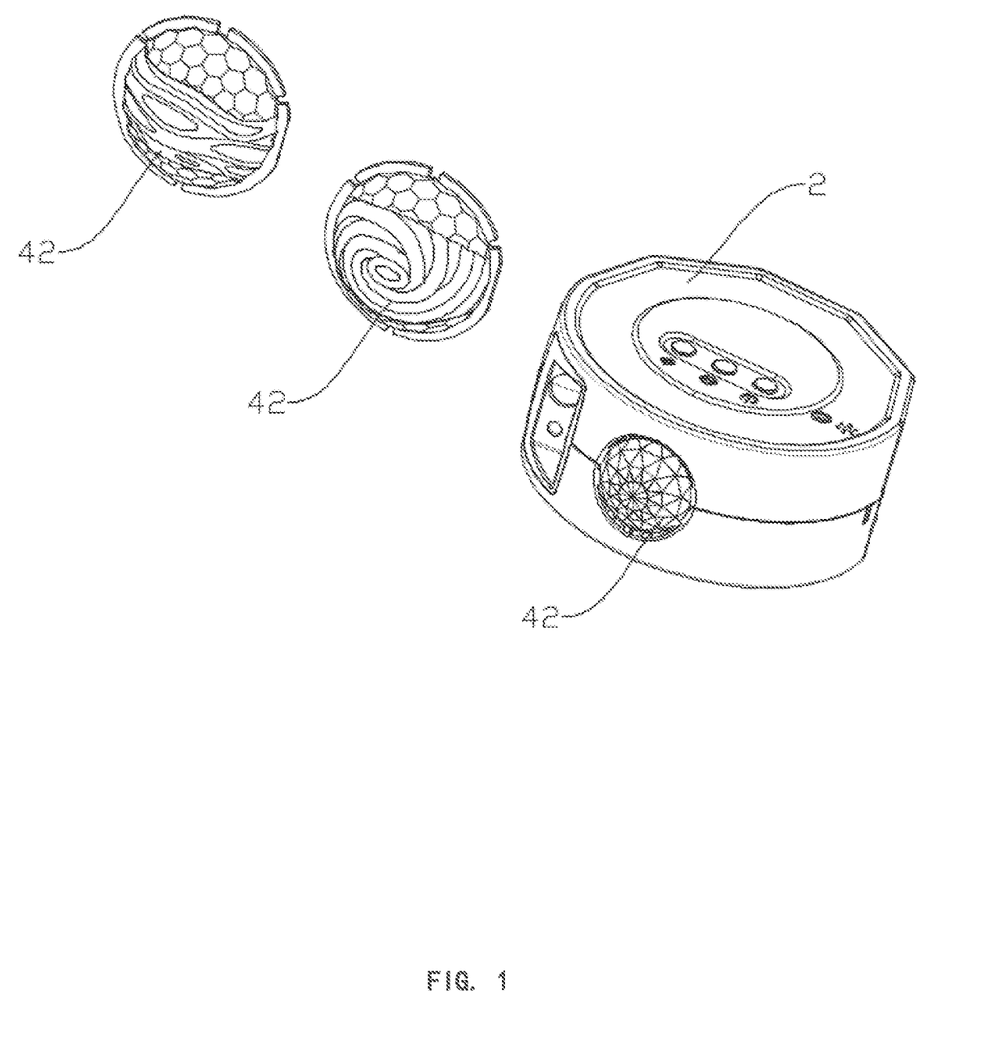
FIG. 1 is a schematic structural diagram of a 3D-pattern waving projecting lamp according to Embodiment 1 of the utility model.
Figure 2:
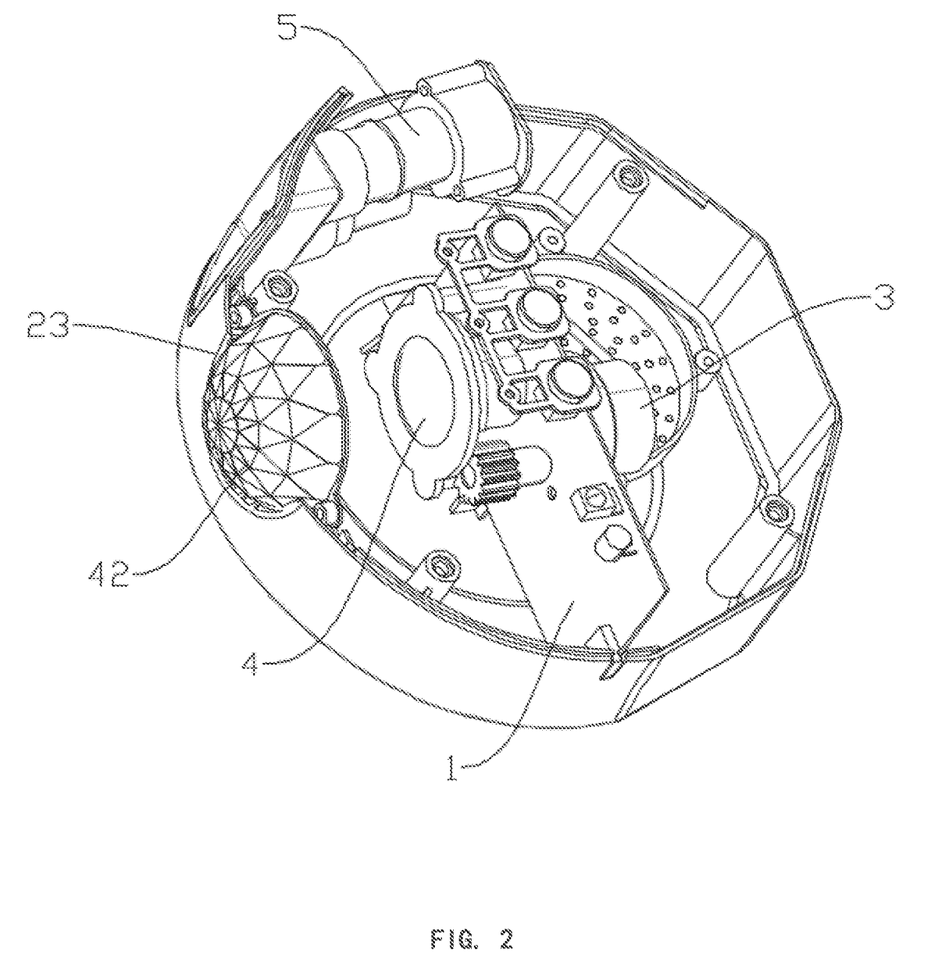
FIG. 2 is a schematic structural diagram of a 3D-pattern waving projecting lamp hidden behind a second housing according to Embodiment 1 of the utility model.
Figure 3:
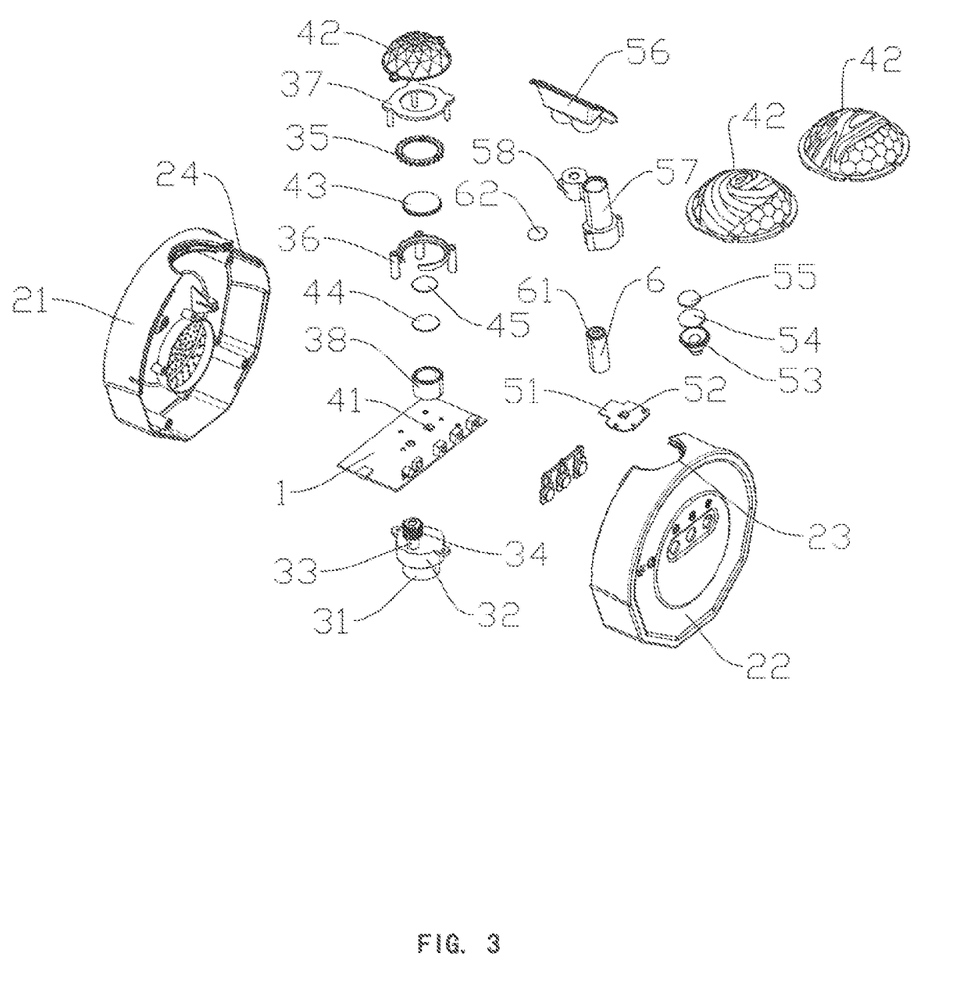
FIG. 3 is an exploded diagram of a 3D-pattern waving projecting lamp according to Embodiment 1 of the utility model.

As shown in FIGS. 1 to 3, a 3D-pattern waving projecting lamp includes a lamp shell assembly 2, a control circuit board 1, a first rotating assembly 3, and a 3D-pattern projecting assembly 4.

The 3D-pattern projecting assembly 4 includes a first light source 41, a first convex lens 42, a second convex lens 43, a third convex lens 44, and a first pattern sheet 45. The lamp shell assembly 2 is provided with a first light outlet 23. The first convex lens 42 is arranged in the first light outlet 23. The control circuit board 1, the first, rotating assembly 3, the first light source 41, the second convex lens 43, the third convex lens 44, and the first pattern sheet 45 are arranged in the lamp shell assembly 2. The first light source 41 and the first rotating assembly 3 are arranged on the control circuit board 1. The first light source 41 and the first rotating assembly 3 are electrically connected to the control circuit board 1. The third convex lens 44 is arranged on a side of the first light source 41 towards the first convex lens 42. The third convex lens 44 focuses light emitted by the first light source 41 to form a light spot. The first pattern sheet 45 is arranged on a side of the third convex lens 44 towards the first convex lens 42. The first pattern sheet 45 receives the light spot and forms a light pattern. The second convex lens 43 is arranged on the first rotating assembly 3 and located, on a side of the first pattern sheet 45 towards the first convex lens 42. The second convex lens 43 receives the light pattern and generates an analog 3D graphic. The first rotating assembly 3 drives the second convex lens 43 to rotate, and the first convex lens 42 receives the analog 3D graphic and generates a plurality of graphics.

In one possible implementation, the first pattern sheet 45 consists of a transparent, opaque, translucent, black and white, or colored sheet-shaped article, which may be a film, a shading sheet or the like. One surface of the second convex lens 43 resting on the first pattern film 45 has an, uneven decorative design. The second convex lens 43 is a special convex lens with a decorative design. One convex surface of the second convex lens 43 is an arc surface, and the other surface of the second convex lens has the uneven decorative design. Like a hilly terrain, mountains and flat surfaces, concave pit shapes, and so on are provided. A surface of the second convex lens away from the first pattern sheet 43 is a convex arc surface. The second convex lens 43 receives the light pattern, which is mixed with the uneven decorative design on the lens and generates the analog 3D graphic. The first rotating assembly 3 drives the second convex lens 43 to rotate. The first convex lens 42 receives the analog 3D graphic and generates a plurality of graphics. The plurality of 3D graphics can be moved, rotated, and changed quickly and slowly.

For the 3D-pattern waving projecting lamp according to the present application, the first convex lens 42 is arranged on the first light outlet 23 of the lamp shell assembly 2. The first light source 41 is arranged on a control circuit board 1. The third convex lens 44 is arranged, on a side of the first light source 41 towards the first convex lens 42. The first pattern sheet 45 is arranged on a side of the third convex lens 44 towards the first convex lens 42, and the second convex lens 43 is arranged on the first rotating assembly 3 and located on a side of the first pattern sheet 45 towards the first convex lens 42. Light generated by the first light source 41 passes through the third convex lens 44. The third convex lens 44 focuses the light and forms a suitable size of a light spot. The light spot illuminates on a graphic of the first pattern sheet 45 and forms a light pattern. The light pattern is then projected on the second convex lens 43. A plurality of uneven decorative designs are provided on a plane of the second convex lens 43, mixed with the projected light pattern, and focused by the second convex lens 43 to form one analog 3D pattern. The analog 3D pattern then passes through the first convex lens 42. The first convex lens 42 receives the analog 3D pattern and generates the plurality of graphics. An entire light effect area becomes a plurality of large and bright 3D effects, which can make the pattern wave. The first rotating assembly 3 drives the second convex lens 43 to rotate, thereby realizing movement of the 3D pattern, producing a visually dynamic effect in a projecting process, and improving a user's experience.

Figure 4:
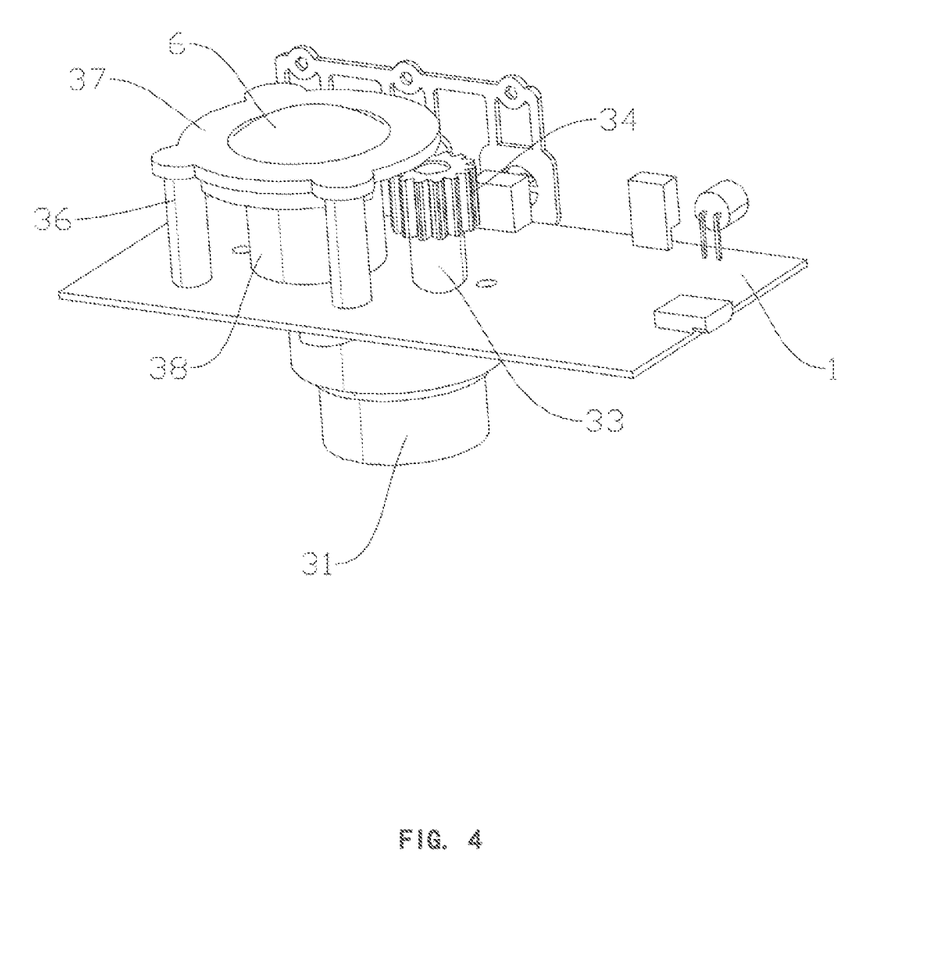
FIG. 4 is a schematic structural diagram of a first rotating assembly according to Embodiment 1 of the utility model.

As shown in FIGS. 3 and 4, the 3D-pattern waving projecting lamp further includes a lens bracket 38. The lens bracket 38 is arranged on the control circuit board 1. The third convex lens 44 is arranged within the lens bracket 38. The first pattern sheet 45 is arranged on the lens bracket 38.

The first rotating assembly 3 includes a first motor 31, a first reduction gearbox 32, a first transmission shaft 33, a first gear 34, a first convex lens seat 35, a first bracket 36, and a first bracket cover 37.

The first bracket 36 and the first motor 31 are arranged on the control circuit board 1. The first motor 31 is electrically connected to the control circuit board 1. The first reduction gearbox 32 is connected to the first motor 31. The first transmission shaft 33 is connected to the first reduction gearbox 32. The first gear 34 is arranged on the first transmission shaft 33.

The first bracket cover 37 is arranged on the first bracket 36. The first convex lens seat 35 is arranged between the first bracket 36 and the first bracket cover 37 and capable of being rotated between the first bracket 36 and the first bracket cover 37. The first convex lens seat 35 is clamped by the first bracket cover 37, so that the first convex lens seat 35 does not fall off from the first bracket 36 and the first bracket cover 37 but can be rotated. A second gear is arranged on the first convex lens seat 35. Optionally, a second gear is arranged on one circle at a periphery of the first convex lens seat 35. The second gear is meshed with the first gear 34. The second convex lens 43 is fixedly arranged on the first convex lens seat 35. The first motor 31 is arranged on a surface of the control circuit board 1 backwards the first light outlet 23. The lens bracket 38 and the first bracket 36 are arranged on a surface of the control circuit board 1 towards the first light outlet 23. The first rotating shaft 33 passes through the control circuit board 1. The first motor 31 drives the first transmission shaft 33 to rotate via the first reduction gearbox 32, and drives the first convex lens seat 35 to rotate via cooperation of the first gear 34 and the second gear, thereby driving the second convex lens 43 to rotate, and realizing movement of the 3D pattern.

In one possible implementation, the third convex lens 44 is fixed within the lens bracket 38. The lens bracket 38 is fixed on the control circuit board 1 and covers the first light source 41.

In one possible implementation, the first pattern sheet 45 is a film sheet. A graphic of the first pattern sheet 45 can be alternately dark and bright, or can be black, white, gray, transparent, or various other colors. Different colors of the films can vary color and brightness of the light spot. The alternately dark and bright film can enrich brightness and darkness gradation of the light spot.

The first convex lens 42 includes a plurality of condensing lenses, which form regular and/or irregular condensing lens groups, that is, the condensing lens groups that can be regular or irregular, or regular and irregular alternatively. The analog 3D pattern passes through the first convex lens 42. Since the plurality of condensing lenses are provided on the first convex lens 42, each of the condensing lens focuses on this 3D pattern to form the plurality of graphics, so that the entire light effect area becomes the plurality of large and bright 3D effects, which can make the pattern wave.

In one possible implementation, the first convex lens 42 includes a plurality of condensing lenses having shapes such as triangles or hexagons, or the first convex lens 42 includes a plurality of irregular circular-arc condensing lenses arranged in a middle of the first convex lens 42 and a plurality of mixed condensing lenses having the shapes such as the triangles or the hexagons and arranged on both sides of the first convex lens 42, or the first convex lens 42 includes nine or fewer irregular long bar-shaped condensing lenses arranged in the middle of the first convex lens 42 and the plurality of mixed condensing lenses having the shapes such as the triangles or the hexagons and arranged on the both sides of the first convex lens 42.

The lamp shell assembly 2 includes a first housing 21 and a second housing 22. The first housing 21 and the second housing 22 are formed with a receiving space. The control circuit board 1, the first rotating assembly 3, the first light source 41, the second convex lens 43, the third convex lens 44, and the first pattern sheet 45 are arranged in the receiving space. The first light outlet 23 is opened and arranged on the first housing 21 and the second, housing 22. The control circuit board 1 is fixed within the first housing 21 and the second housing 22.

Figure 5:
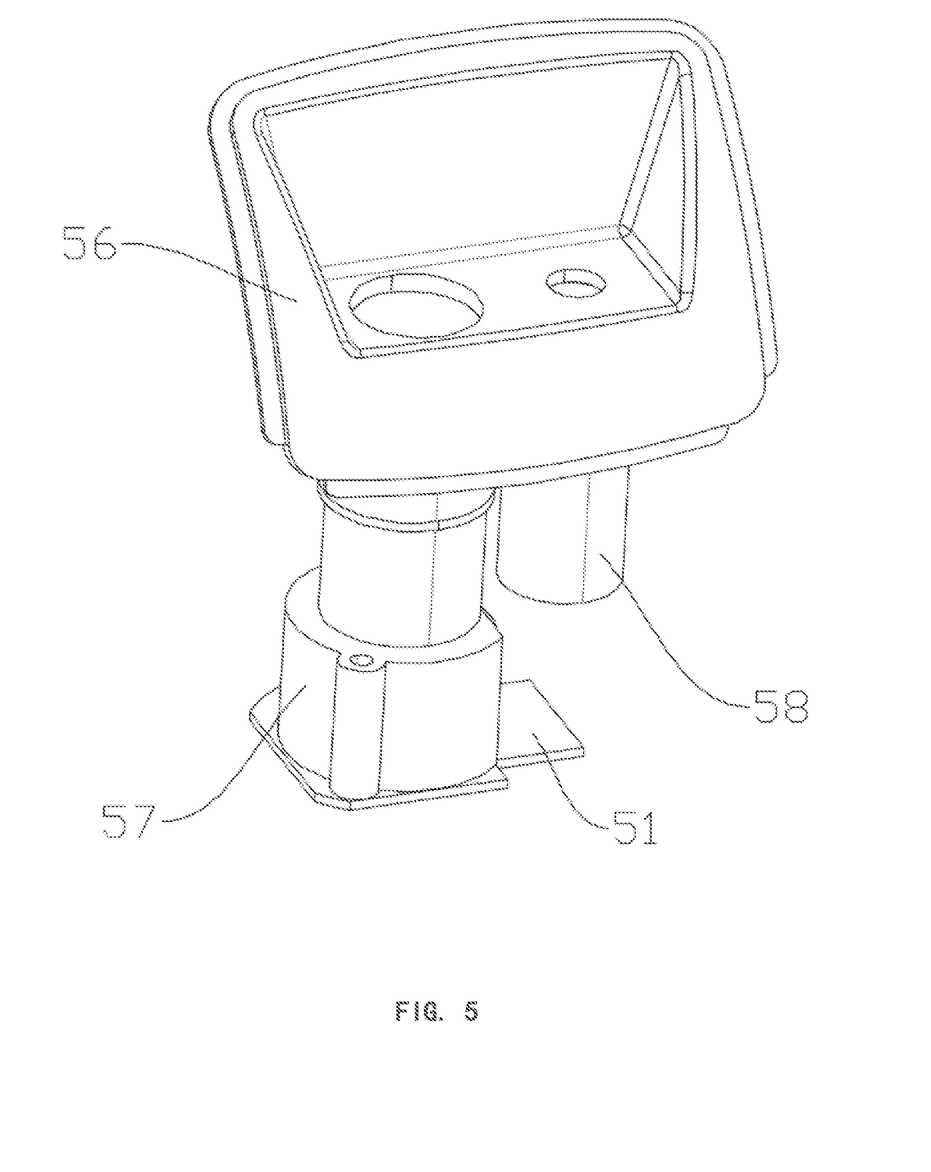
FIG. 5 is a schematic structural diagram of a graphic light effect assembly according to Embodiment 1 of the utility model.

As shown in FIGS. 2, 3 and 5, in one possible implementation, the 3D-pattern waving projecting lamp further includes a graphic light effect assembly 5. The graphic light effect assembly 5 includes a light beam generator 51, a second light source 52, a condensed light cup 53, a second pattern sheet 54, a fourth convex lens 55, a second bracket 56, and a first sleeve 57. The second light source 52 is arranged on the light beam generator 51. The first sleeve 57 is covered and arranged on the light beam generator 51. The second light source 52, the condensed light cup 53, the second pattern sheet 54, and the second convex lens 43 are provided in the first sleeve 57 sequentially. The lamp shell assembly 2 is provided with a second light outlet 24. The second bracket 56 is provided at the second light outlet 24. The first sleeve 57 is provided on the second bracket 56. A light beam emitted by the second light source 52 passes through the condensed light cup 53, then passes through the second pattern film 54, then passes through the fourth convex lens 55, and finally enlarges the pattern on the second pattern sheet 54 to form a projecting pattern.

In one possible implementation, the 3D-pattern waving projecting lamp further includes a laser starry sky assembly 6. The laser starry sky assembly 6 includes a laser module 61 and a laser optical grating 62. A second sleeve 58 is arranged on the first sleeve 57. The laser optical grating 62 and the laser module 61 are arranged within the second sleeve 58. The laser optical grating 62 is located on a side of the laser module 61 towards the second light outlet 24. The laser module 61 emits light and generates a relatively small light ray. The laser light ray is diverged via the laser optical grating 62 to form more than 100 light spots, forming a laser starry sky light spot.

The first convex lens 42 is arranged on the first light outlet 23 of the lamp shell assembly 2. The first light source 41 is arranged on a control circuit board 1. The third convex lens 44 is arranged on a side of the first light source 41 towards the first convex lens 42. The first pattern sheet 45 is arranged on a side of the third convex lens 44 towards the first convex lens 42, and the second convex lens 43 is arranged on the first rotating assembly 3 and located on a side of the first pattern sheet 45 towards the first convex lens 42. Light generated by the first light source 41 passes through the third convex lens 44. The third convex lens 44 focuses the light and forms a suitable size of a light spot. The light spot illuminates on a graphic of the first pattern sheet 45 and forms a light pattern. The light pattern is then projected on the second convex lens 43. Many decorative designs in irregular shapes and irregular sizes and with varying heights of raised portions are provided on a plane of the second convex lens 43. The light pattern is focused by the second convex lens 43 to form one analog 3D graphic. The analog 3D graphic then passes through the first convex lens 42. Since many condensing lenses are provided on the first convex lens 42, each of the condensing lens focuses this 3D pattern to form many graphics, so that an entire light effect area becomes a plurality of large and bright 3D effects, which can make the pattern wave. The first motor 31 drives a first transmission shaft 33 to rotate via a first reduction gearbox 32, and drives a first convex lens seat 35 to rotate via cooperation of the first gear 34 and the second gear, thereby driving the second convex lens 35 to rotate, realizing movement of the 3D pattern, producing a visually dynamic effect in, a projecting process, and improving the user' experience.

Embodiment 2

As shown in FIGS. 6 to 9, a 3D-pattern waving projecting lamp includes a lamp shell assembly 2, a control circuit board 1, a first rotating assembly 3, and a 3D-pattern projecting assembly 4. The 3D-pattern projecting assembly 4 includes a first light source 41, a first convex lens 42, a second convex lens 43, a third convex lens 44, and a first pattern sheet 45. The lamp shell assembly 2 is provided with a light outlet 23. The first convex lens 42 is arranged in the light outlet 23. The control circuit board 1, the first rotating assembly 3, the first light source 41, the second convex lens 43, the third convex lens 44, and the first pattern sheet 45 are arranged in the lamp shell assembly 2. The first light source 41 and the first rotating assembly 3 are arranged on the control circuit board 1. The first light source 41 and the first rotating assembly 3 are electrically connected to the control circuit board 1. The third convex lens 44 is arranged on a side of the first light source 41 towards the first convex lens 42. The third convex lens 44 focuses light emitted by the first light source 41 to form a light spot. The first pattern sheet 45 is arranged on, a side of the third convex lens 44 towards the first convex lens 42. The first pattern sheet 45 receives the light spot and forms a light pattern. The second convex lens 43 is arranged on the first rotating assembly 3 and located on a side of the film towards the first convex lens 42. The second convex lens 43 receives the light pattern and generates an analog 3D graphic. The first rotating assembly 3 drives the second convex lens 43 to rotate. The first convex lens 42 receives the analog 3D graphic and generates a plurality of graphics.

It should be noted that structures of the first convex lens 42, the second convex lens 43, the third convex lens 44, and the first pattern sheet 45 are the same as those of the first convex lens 42, the second convex lens 43, the third convex lens 44, and the first pattern sheet 45 of Embodiment 1, which are not repeated in this embodiment.

Figure 7:
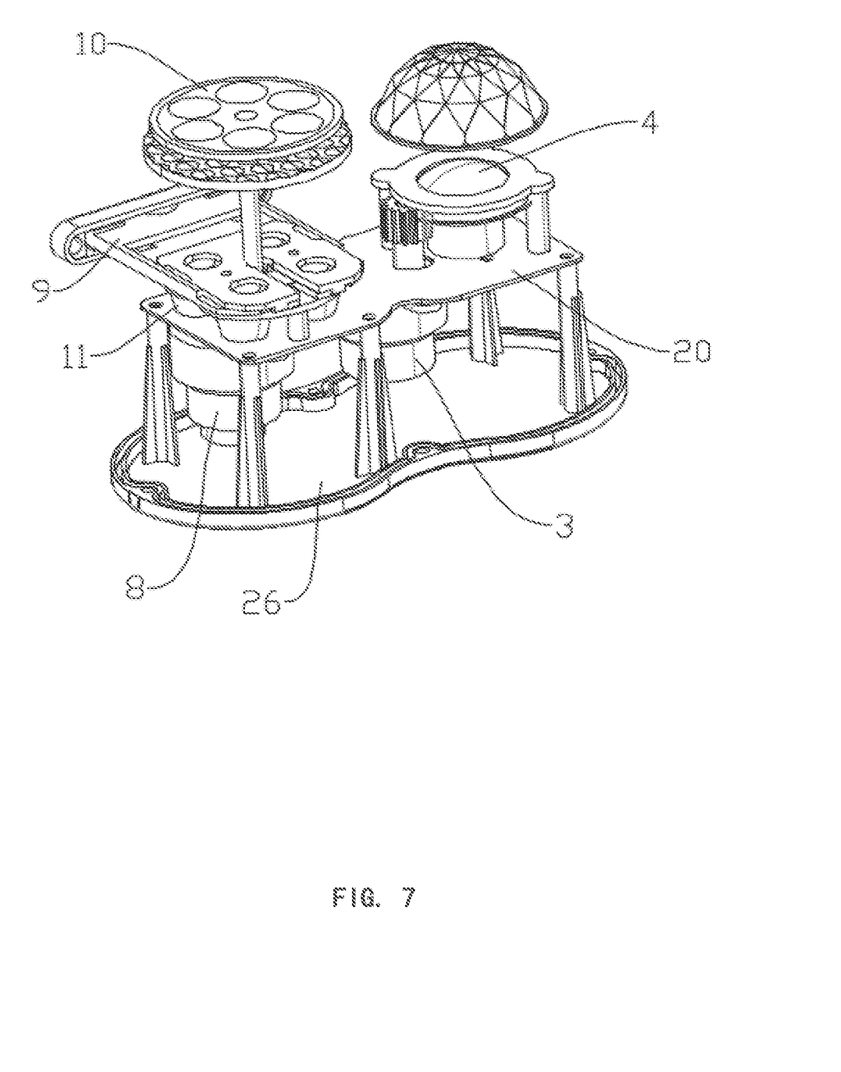
FIG. 7 is a schematic structural diagram of a 3D-pattern waving projecting lamp hidden behind a third housing according to Embodiment 2 of the utility model.
Figure 9:
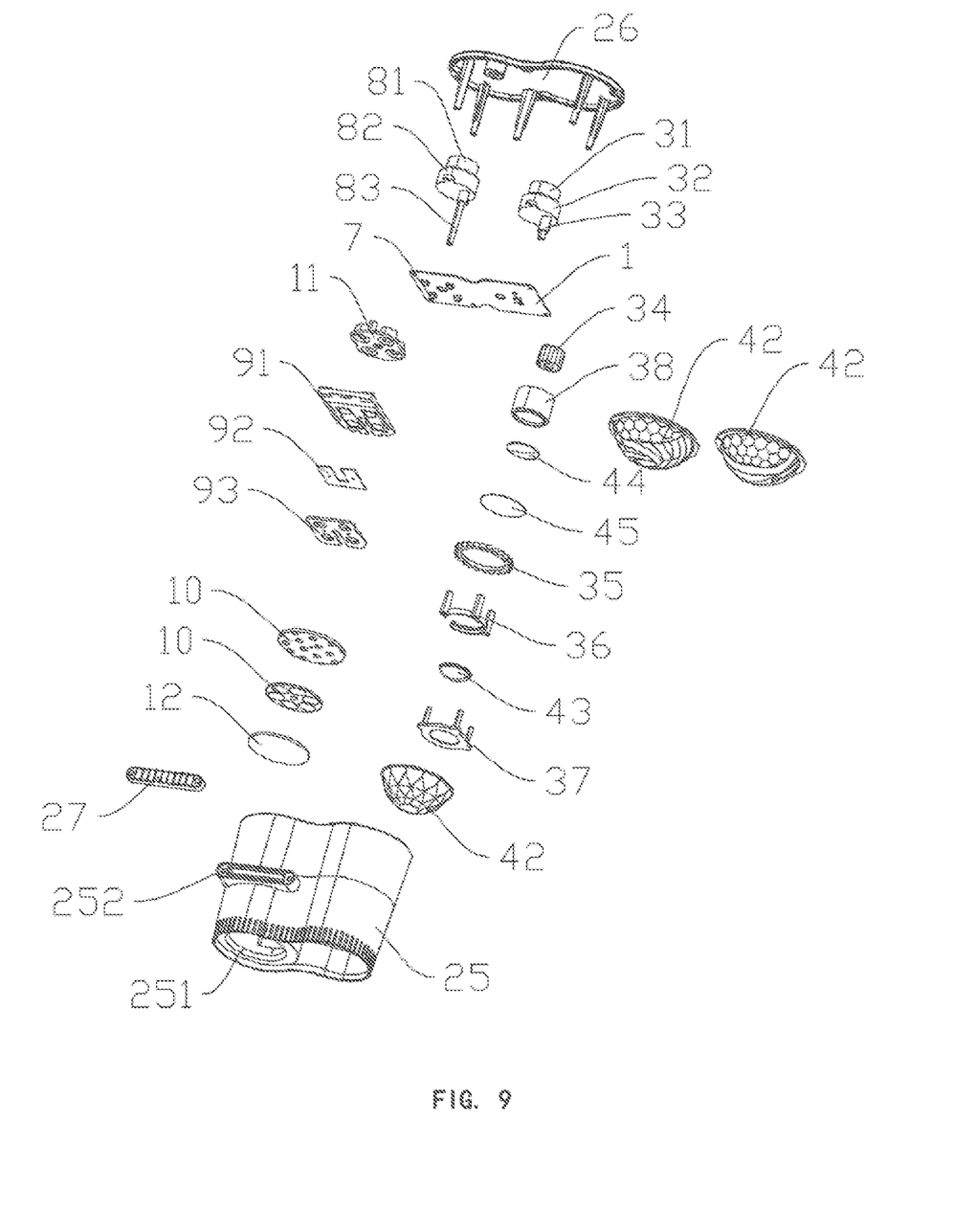
FIG. 9 is an exploded diagram of a 3D-pattern waving projecting lamp according to Embodiment 2 of the utility model.

The 3D-pattern waving projecting lamp further includes a light-emitting assembly 7, a second rotating assembly 8, a fifth convex lens 10, a sixth convex lens 11, and a film assembly 9. The film assembly 9 is detachably arranged on the housing assembly. The light-emitting assembly 7, the second rotating assembly 8, and the sixth convex lens 11 are arranged on the control circuit board 1. The light-emitting assembly 7 and the second rotating assembly 8 are electrically connected to the control circuit board 1. The fifth convex lens 10 is arranged on the second rotating assembly 8.

Figure 6:
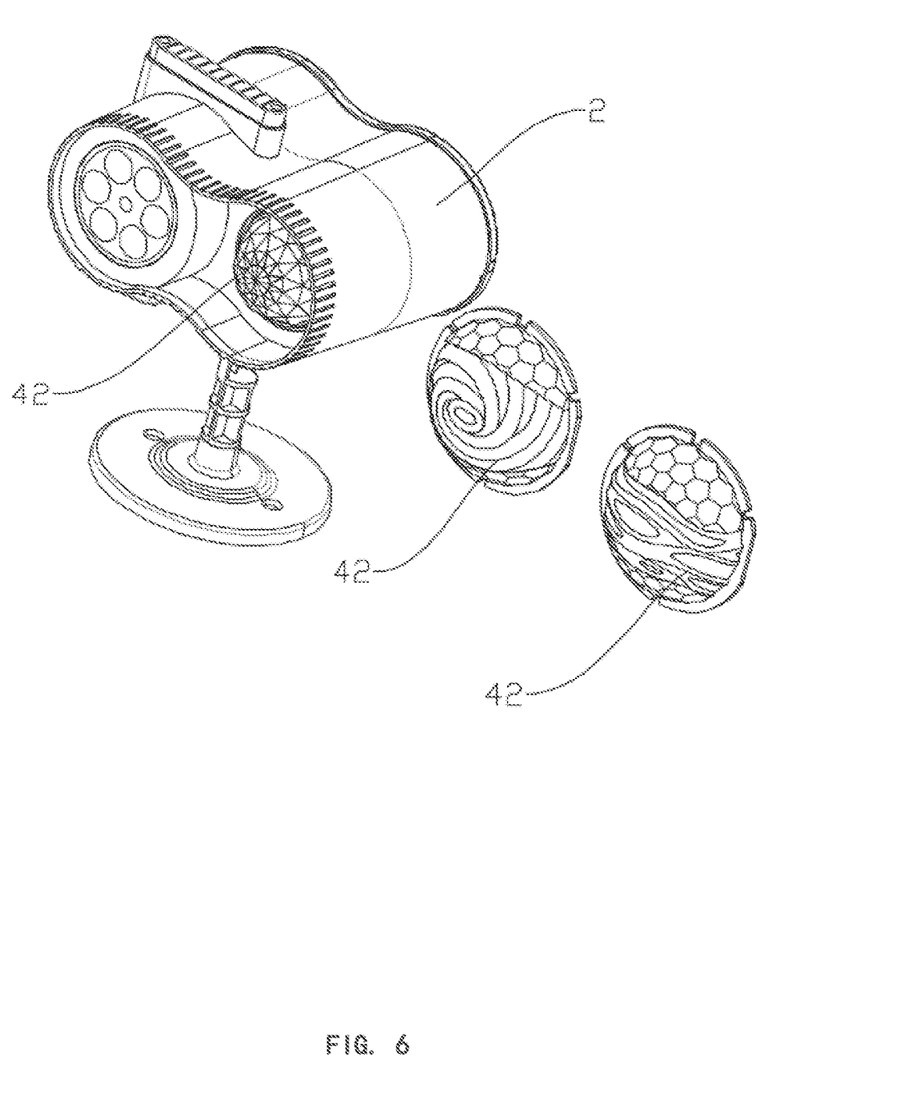
FIG. 6 is a schematic structural diagram of a 3D-pattern waving projecting lamp according to Embodiment 2 of the utility model.

The lamp shell assembly 2 includes a third housing 25, a fourth housing 26, and a cover body 27. The third housing 25 and the fourth housing 26 are formed with a receiving space. The light-emitting assembly 7, the second rotating assembly 8, the fifth convex lens 10, the sixth convex lens 11, and the film assembly 9 are arranged in the receiving space.

In one possible implementation, the light outlet is two cylindrical openings 251 arranged on the third housing 25. A long bar-shaped opening 252 is also arranged on the third housing 25.

In one possible implementation, the film assembly 9 includes a film bracket base 91, a third film 92, and a film bracket cover 93. The third film 92 is arranged on the film, bracket base 91. The film bracket cover 93 is arranged on the third film 92. The film assembly 9 is inserted into or pulled out of the lamp shell assembly 9 via the long bar-shaped opening 252. The 3D-pattern waving projecting lamp further includes a transparent sheet 12. The transparent sheet 12 is arranged in the cylindrical opening 251 of the third housing 25 to seal a housing assembly. After pulling out film assembly 9 from the housing assembly, the film assembly 9 of other patterns can be inserted so as to project the other patterns. After the film assembly 9 is inserted, the cover body 27 is covered, to seal the housing assembly.

In one possible implementation, the fifth convex lens 10 includes six or more convex lenses. The fifth convex lens 10 is connected to the second rotating assembly 8.

In one possible implementation, the sixth convex lens 11 includes four or more planoconvex lenses. The four or more planoconvex lenses form a joined planoconvex lens, two or more mounting feet are arranged on the sixth convex lens 11. The mounting feet has a height of 5-15 mm. The mounting feet are arranged on the control circuit board 1. The sixth convex lens 11 is mounted on the control circuit board 1 via the mounting feet.

In one possible implementation, the light-emitting assembly 7 includes four or more LED beads. Each of the LED beads corresponds to a central position of each of the planoconvex lenses in the sixth convex lens 11. The third film 92 is located between the fifth convex lens 10 and the sixth convex lens 11. Optionally, a distance of the light-emitting surface of the LED beads from a plane of the sixth convex lens 11 is 0-5 mm. Light of the LED beads can be projected onto the plane of the sixth convex lens 11. Optionally, the third film 92 can be fixedly mounted on the housing assembly, or can be mounted on the film bracket cover 93 and the film bracket base 91 and inserted into the housing assembly and clamped.

Figure 8:
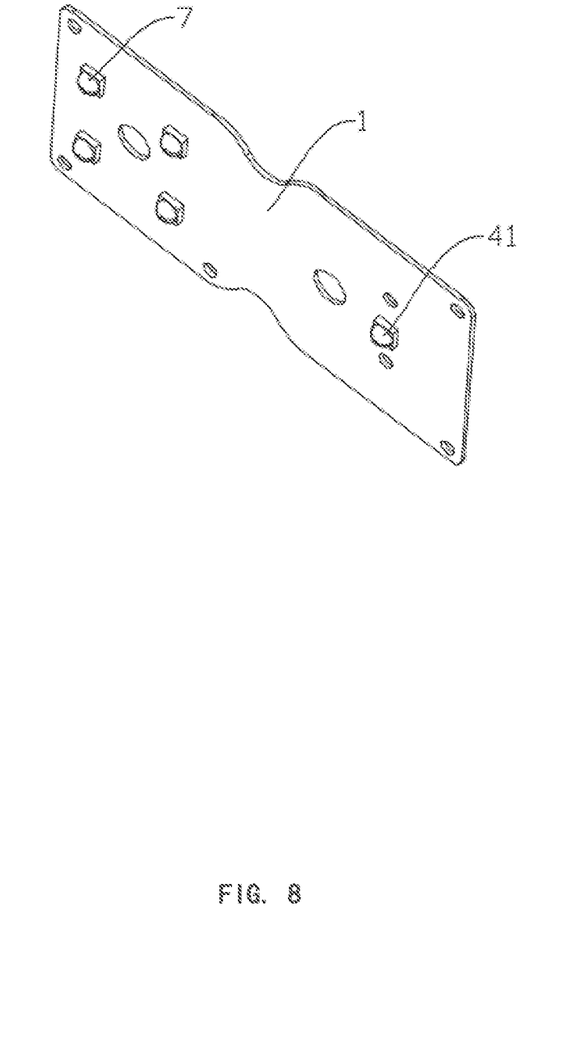
FIG. 8 is a schematic structural diagram of a control circuit board according to Embodiment 2 of the utility model.

The second rotating assembly 8 includes a second motor 81, a second reduction gearbox 82, and a second transmission shaft 83. The second reduction gearbox 83 is connected to the second motor 81. The second transmission shaft 83 is connected to the second reduction gearbox 82. The fifth convex lens 10 is arranged on the rotating shaft so that the fifth convex lens 10 can be rotated. A middle of the light-emitting assembly 7 is provided with a hole via which the second transmission shaft 83 passes through the control circuit board 1.

Obviously, the embodiments described above are only part of the embodiments of the utility model, not all of the embodiments. The drawings give a preferable embodiment of the utility model, but do not limit the scope of the patent of the utility model. The utility model can be implemented in many different forms, but on the contrary, an objective of providing these embodiments is to provide a more thorough understanding of the disclosure of the utility model. Although the utility model has been described in detail with reference to the above embodiments, it is still possible for the person skilled in the art to modify the technical solutions described in the above embodiments, or to equivalently replace part of the technical features therein. Equivalent structures made with the content of specification and drawings of the utility model, directly or indirectly applied in other related technical arts, are also within the scope of protection of the patent of the utility model.

The invention claimed is:

1. A 3D-pattern waving projecting lamp comprising
a lamp shell assembly, a control circuit board, a first rotating assembly, and a 3D-pattern projecting assembly;
the 3D-pattern projecting assembly comprises a first light source, a first convex lens, a second convex lens, a third convex lens, and a first, pattern sheet, the lamp shell assembly is provided with a first light outlet, the first convex lens is arranged in the first light outlet, the control circuit board, the first rotating assembly, the first light source, the second convex lens, the third convex lens, and the first pattern sheet are arranged in the lamp shell assembly, the first light source and the first rotating assembly are arranged on the control circuit board, the first light source and the first rotating assembly are electrically connected to the control circuit board, the third convex lens is arranged on a side of the first light source towards the first convex lens, the third convex lens focuses light emitted by the first light source to form a light spot, the first pattern sheet is arranged, on a side of the third convex lens towards the first, convex lens, the first pattern sheet receives the light spot and forms a light pattern, the second convex lens is arranged on the first rotating assembly and located on a side of the first pattern sheet towards the first convex lens, the second convex lens receives the light pattern and generates an analog 3D graphic, the first rotating assembly drives the second convex lens to rotate, and the first convex lens receives the analog 3D graphic and generates a plurality of graphics;

the first rotating assembly comprises a first motor, a first reduction gearbox, a first transmission shaft, a first gear, a first convex lens seat a first, bracket, and a first bracket cover, the first bracket and the first motor are arranged on the control circuit board, the first motor is electrically connected to the control circuit board, the first reduction gearbox is connected to the first motor, the first transmission shaft is connected to the first reduction gearbox, and the first gear is arranged on the first transmission shaft;

the first convex lens comprises a plurality of convex lenses having shapes such as triangles or hexagons, or the first convex lens comprises a plurality of irregular circular-arc condensing lenses arranged in a middle of the first convex lens and a plurality of nixed condensing lenses having the shapes such as the triangles or the hexagons and arranged on both sides of the first convex lens, or the first convex lens comprises nine or fewer irregular long bar-shaped condensing lenses arranged in the middle of the first convex lens and the plurality of mixed condensing lenses having the shapes such as the triangles or the hexagons and arranged on the both sides of the first convex lens;

the first bracket cover is arranged on the first bracket, the first convex lens seat is arranged between the first bracket and the first bracket cover and capable of being rotated between the first bracket and the first bracket cover, a second gear is arranged on the first convex lens seat, the second gear is meshed with the first gear, and the second convex lens is fixedly arranged on the first convex lens seat;

the second convex lens is a convex lens with a decorative design, one convex surface of the second convex lens is an arc surface, and the other surface of the second convex lens has an uneven decorative design.

2. The 3D-pattern waving projecting lamp according to claim 1, wherein the 3D-pattern waving projecting lamp further comprises a light-emitting assembly, a second rotating assembly, a fifth convex lens, a sixth convex lens, and a film assembly, the film assembly is detachably arranged on the housing assembly, the light-emitting assembly, the second rotating assembly, and the sixth convex lens are arranged on the control circuit board, the light-emitting assembly and the second rotating assembly are electrically connected to the control circuit board, and the fifth convex lens is arranged on the second rotating assembly.

3. The 3D-pattern waving projecting lamp according to claim 2, wherein the lamp shell assembly comprises a third housing, a fourth housing, and a cover body, the third housing and the fourth housing are formed with a receiving space, the light-emitting assembly, the second rotating assembly, the fifth convex lens, the sixth convex lens, and the film assembly are arranged in the receiving space, and the third housing is provided with two cylindrical openings and one long bar-shaped opening;

the film assembly comprises a film bracket base, a third film, and a film bracket cover, the third film is arranged on the film bracket base, the film bracket cover is arranged on the third film, the film assembly is inserted, into or pulled out of the lamp shell assembly via the long bar-shaped opening, the 3D-pattern waving projecting lamp further comprises a transparent sheet, and the transparent sheet is arranged on the cylindrical opening.

4. The 3D-pattern waving projecting lamp according to claim 3, wherein the fifth convex lens comprises six or more convex lenses, and the fifth convex lens is connected to the second rotating assembly;

the sixth convex lens comprises four or more planoconvex lenses, the four or more planoconvex lenses form a joined planoconvex lens, two or more mounting feet are provided on the sixth convex lens, and the mounting feet, are arranged on the light-emitting assembly;

the light-emitting assembly comprises four or more LED beads, each of the LED beads corresponds to a central position of each of the planoconvex lenses in the sixth convex lens, and the third film is located between the fifth convex lens and the sixth convex lens.

5. The 3D-pattern waving projecting lamp according to claim 2, wherein the second rotating assembly comprises a second motor, a second reduction gearbox, and a second transmission shaft, the second reduction gearbox is connected to the second motor, the second transmission shaft is connected to the second reduction gearbox, and the fifth convex lens is arranged on the second transmission shaft.

6. The 3D-pattern waving projecting lamp according to claim 1, wherein the lamp shell assembly comprises a first housing and a second housing, the first housing and the second housing are formed with a receiving space, and the control circuit board, the first rotating assembly, the first light source, the second convex lens, the third convex lens, and the first pattern sheet are arranged in the receiving space.

7. The 3D-pattern waving projecting lamp according to claim 6, wherein the 3D-pattern waving projecting lamp further comprises a lens bracket, the lens bracket is arranged on the control circuit board, the third convex lens is arranged within the lens bracket, the first pattern sheet is arranged on the lens bracket; and the first pattern sheet consists of a transparent, opaque, translucent, black and white, or colored sheet-shaped article.

8. The 3D-pattern waving projecting lamp according to claim 7, wherein the first pattern sheet is a film or a shading sheet.

9. The 3D-pattern waving projecting lamp according to claim 1, wherein the 3D-pattern waving projecting lamp further comprises a graphic light effect assembly, the graphic light effect assembly comprises a light beam generator, a second light source, a condensed light cup, a second pattern sheet, a fourth convex lens, a second bracket, and a first sleeve, the second light source is arranged on the light beam generator, the first sleeve is covered and arranged on the light beam generator, the second light source, the condensed light cup, the second pattern sheet, and the second, convex lens are provided in the first sleeve sequentially, the lamp shell assembly is provided with a second light outlet, the second bracket is provided at the second light outlet, and the first sleeve is provided on the second bracket.

10. The 3D-pattern waving projecting lamp according to claim 9, wherein the 3D-pattern waving projecting lamp further comprises a laser starry sky assembly, the laser starry sky assembly comprises a laser module and a laser optical grating, a second sleeve is arranged on the first sleeve, the laser optical grating and the laser module are arranged within the second sleeve, and the laser optical grating is located on a side of the laser module towards the second light outlet.

\* \* \* \* \*